US008341558B2

(12) United States Patent
Li

(10) Patent No.: US 8,341,558 B2
(45) Date of Patent: Dec. 25, 2012

(54) GESTURE RECOGNITION ON COMPUTING DEVICE CORRELATING INPUT TO A TEMPLATE

(75) Inventor: Yang Li, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 399 days.

(21) Appl. No.: 12/641,114

(22) Filed: Dec. 17, 2009

(65) Prior Publication Data

US 2011/0066984 A1    Mar. 17, 2011

Related U.S. Application Data

(60) Provisional application No. 61/243,117, filed on Sep. 16, 2009.

(51) Int. Cl.
*G06F 3/033* (2006.01)
(52) U.S. Cl. ........................................ 715/863
(58) Field of Classification Search ............ 715/863
See application file for complete search history.

(56) References Cited

U.S. PATENT DOCUMENTS

2006/0253793 A1* 11/2006 Zhai et al. ............... 715/773
2009/0006292 A1    1/2009 Block

FOREIGN PATENT DOCUMENTS

GB    2419433    4/2006

OTHER PUBLICATIONS

Kara; Levent Burak et al., "An image-based, trainable symbol recognizer for hand-drawn sketches," Computers & Graphics, vol. 29, Issue 4, Aug. 2005, pp. 501-517.*
Android Developers, "Android 1.6 Platform Highlights", Sep. 2009, published by the Internet Society, http://developer.android.com/sdk/android-1.6-highlights.html, downloaded Sep. 16, 2009, 4 pages.
Android Developers, "Android 1.6 Version Notes", Sep. 2009, published by the Internet Society, http://developer.android.com/sdk/android-1.6.html, downloaded Sep. 16, 2009, 5 pages.
Android Developers, "Android.gesture", Sep. 2009, published by the Internet Society, http://developer.android.com/reference/android/gesture/package-summary.html, downloaded Sep. 16, 2009, 1 page.
Android Developers, "Gesture", Sep. 2009, published by the Internet Society, http://developer.android.com/reference/android/gesture/Gesture.html, downloaded Sep. 16, 2009, 4 pages.

(Continued)

*Primary Examiner* — Doon Chow
*Assistant Examiner* — Wilson Varga
(74) *Attorney, Agent, or Firm* — Young Basile Hanlon & MacFarlane P.C.

(57) ABSTRACT

A computer-implemented user interface method is disclosed. The method includes displaying information on a touchscreen of a computing device, receiving from a user of the device an input drawn on the touchscreen, correlating the input to a template, where the correlating includes employing a closed-form solution to find a rotation that reduces angular distance between the input and the template, and providing output based on a result of the correlating.

17 Claims, 10 Drawing Sheets

OTHER PUBLICATIONS

Android Developers, "GestureLibraries", Sep. 2009, published by the Internet Society, http://developer.android.com/reference/android/gesture/GestureLibraries.html, downloaded Sep. 16, 2009, 1 page.

Android Developers, "GestureLibrary", Sep. 2009, published by the Internet Society, http://developer.android.com/reference/android/gesture/GestureLibrary.html, downloaded Sep. 16, 2009, 3 pages.

Android Developers, "GestureOverlayView.OnGestureListener", Sep. 2009, published by the Internet Society, http://developer.android.com/reference/android/gesture/GestureOverlayView.OnGestureListener.html, downloaded Sep. 16, 2009, 1 page.

Android Developers, "GestureOverlayView.OnGesturePerformedListener", Sep. 2009, published by the Internet Society, http://developer.android.com/reference/android/gesture/GestureOverlayView.OnGesturePerformedListener.html, downloaded Sep. 16, 2009, 1 page.

Android Developers, "GestureOverlayView.OnGesturingListener", Sep. 2009, published by the Internet Society, http://developer.android.com/reference/android/gesture/GestureOverlayView.OnGesturingListener.html, downloaded Sep. 16, 2009, 1 page.

Android Developers, "GestureOverlayView", Sep. 2009, published by the Internet Society, http://developer.android.com/reference/android/gesture/GestureOverlayView.html, downloaded Sep. 16, 2009, 10 pages.

Android Developers, "GesturePoint", Sep. 2009, published by the Internet Society, http://developer.android.com/reference/android/gesture/GesturePoint.html, downloaded Sep. 16, 2009, 2 pages.

Android Developers, "GestureStore", Sep. 2009, published by the Internet Society, http://developer.android.com/reference/android/gesture/GestureStore.html, downloaded Sep. 16, 2009, 4 pages.

Android Developers, "GestureStroke", Sep. 2009, published by the Internet Society, http://developer.android.com/reference/android/gesture/GestureStroke.html, downloaded Sep. 16, 2009, 2 pages.

Android Developers, "OrientedBoundingBox", Sep. 2009, published by the Internet Society, http://developer.android.com/reference/android/gesture/OrientedBoundingBox.html, downloaded Sep. 16, 2009, 2 pages.

Android Developers, "Prediction", Sep. 2009, published by the Internet Society, http://developer.android.com/reference/android/gesture/Prediction.html, downloaded Sep. 16, 2009, 2 pages.

Kurtenbach et al., "The Limits of Expert Performance Using Hierarchic Marking Menus", Apr. 29, 1993, Association for Computing Machinery, Interchi '93, pp. 482-487, 6 pages.

Rubine, Dean, "Specifying Gestures by Example", Jul. 1991, Computer Graphics, 25(4):329-337, 9 pages.

Wobbrock et al., "Gestures Without Libraries, Toolkits or Training: A $1 Recognizer for User Interface Prototypes", Oct. 7-10, 2007, Association for Computing Machinery, in User Interface Software and Technology Proceedings, pp. 159-168, 10 pages.

Zhai et al., "Shorthand Writing on Stylus Keyboard", Apr. 5-10, 2003, Association for Computing Machinery, CHI Letters, 5(1):97-104, 8 pages.

Albert, Jozsef, Authorized Officer, European Patent Office, PCT Application No. PCT/US2010/049180, filed Sep. 16, 2010, in International Search Report, mailed Dec. 7, 2010, 12 pages.

Kara L. et al., "An image-based, trainable symbol recognizer for hand-drawn sketches," Aug. 1, 2005, Computers and Graphics 29(4):510-517, 17 pages.

Li, Yang, "Protractor: A Fast and Accurate Gesture Recognizer", Apr. 15, 2010, retrieved from the Internet: http://delivery.acm.org/10.1145/1760000/1753654/p2169-li.pdf?key1=1753654&key2=9453498821&coll=DL&d1=ACM&CFID=109021903&CFTOKEN=72972092, 2 pages.

* cited by examiner

GESTURE RECOGNITION ON COMPUTING DEVICE CORRELATING INPUT TO A TEMPLATE

CROSS REFERENCE TO RELATED APPLICATIONS

This application claims the benefit of the priority of U.S. Provisional Application Ser. No. 61/243,117, filed Sep. 16, 2009 and entitled "Protractor: A Fast and Accurate Gesture Recognizer."

TECHNICAL FIELD

This document relates to systems and techniques for recognizing gestures in input to a computing device, which gestures can be entered glyphs or drawn symbols, such as alphabetic characters.

BACKGROUND

People spends hours at a time with their electronic devices—computers, mobile phones, music players, and the like. They like best those devices that are intuitive to use and whose interactions best meet their expectations regarding how machines should work. They interact with electronics through inputs and outputs from the devices, where the outputs generally are provided audibly and/or on a flat graphical display screen, and the inputs may occur via touchscreens, joysticks, mice, 4-directional keypads, and other such input mechanisms. As mobile devices become more powerful, users interact with them more using graphical objects, such as lists of items, maps, images, and the like.

Moreover, users have come to expect more rapid and intuitive user interfaces for such mobile devices. This has lead to developments in the area of gestures-based interaction with computing devices, such as through the use of two dimensional (2D) trajectories drawn by users with their finger on a touchscreen or with a pen. These gesture-based user interfaces typically employ gesture recognition software, which can include template-based recognizers or parametric-based recognizers.

SUMMARY

This document describes systems and techniques that can be used to recognize user input to a computing device, such as a mobile phone, personal digital assistant (PDA) or satellite navigation device, which can include a touchscreen user interface. In general, the techniques may react to user input by processing the input to determine whether it matches a predefined gesture template that is associated with some action or object in a user interface of a computer system. The predefined gesture template can be preprogrammed or defined by an end user, and generally represents a gesture (or glyph), which is a visual writing element that a user can enter, such as by dragging their finger on a touchscreen, often in a single traced motion without lifting their finger. Gestures (or glyphs) can include alphanumeric characters and other symbols.

A gesture recognizer in a computing device can measure the similarity between gestures by calculating a cosine distance between two vector representations of the gestures. This can include calculating a minimum angular distance between the gestures with a closed-form solution. Moreover, the gesture recognizer can avoid any need to rescale sampled points of the gestures, such as to fit a square, in the course of generating the vector representations to be compared.

In certain implementations, such systems and technique may provide one or more of the following advantages. A gesture recognizer can be provided that avoids complexity and is readily customizable for different users. A nearest neighbor approach can be used, which recognizes an unknown gesture based on its similarity to each of the known gestures, e.g., training samples or examples given by a user. The speed and accuracy of gesture recognition can be improved, and more gesture variation can be readily covered. The aspect ratio of a gesture can be preserved, and narrow (or 1-dimensional) gestures, such as horizontal or vertical lines, can be recognized. Moreover, the gesture recognition techniques described can run significantly faster and use less memory than other approaches. This can improve suitability for mobile computing, which is often limited in processing power and memory.

In general, one aspect of the subject matter described in this specification can be embodied in methods that include actions including displaying information on a touchscreen of a computing device, receiving from a user of the device an input drawn on the touchscreen, correlating the input to a template, where the correlating includes employing a closed-form solution to find a rotation that reduces angular distance between the input and the template, and providing output based on a result of the correlating. Displaying the information can include displaying content from an operating system or application operating on the device, and the correlating can include identifying a user-defined glyph corresponding to the input. The input can be defined by a pointer contact with the touchscreen followed by a pointer release from the touchscreen, and a pointer path traced on the touchscreen between the pointer contact and the pointer release.

The actions can also include preprocessing the input, before the correlating, in accordance with a predefined uniform representation. The predefined uniform representation can include a vector representation of N points; the correlating can include finding an angle between a vector representation of the input and a vector representation of the template in an N-dimensional space to generate a similarity score; and the employing can include calculating the rotation from the vector representation of the input and the vector representation of the template. Moreover, the correlating can include generating the similarity score, S, in accordance with a first equation, $$S(t, g) = \frac{1}{\arccos \frac{v_t \cdot v_g}{|v_t||v_g|}},$$

where $v_t$ corresponds to the vector representation of the template, t, and $v_g$ corresponds to the vector representation of the input, g; and the employing can include calculating the rotation, $\theta_{optimal}$, in accordance with a second equation, $$\theta_{optimal} = \arctan \frac{b}{a}, \text{ where}$$

$$a = v_t \cdot v_g = \sum_{i=1}^{n} (x_{ti}x_{gi} + y_{ti}y_{gi}), \text{ and } b = \sum_{i=1}^{n} (x_{ti}y_{gi} - y_{ti}x_{gi}).$$

The preprocessing can include resampling the input into a fixed number, N, equidistantly-spaced points, translating the points to place a centroid of the points at an origin of a coordinate space, determining whether the input is to be considered orientation invariant, rotating the translated points around the centroid in accordance with an indicative angle of the translated points, if the input is orientation invariant, to define an input vector, and aligning the translated points with one of multiple base orientations in the coordinate space, if the input is not orientation invariant, to define the input vector. Additionally, the correlating can include calculating the rotation in accordance with an arc tangent function, rotating the template in accordance with the rotation to generate a template vector, and calculating a similarity score from the input vector and the template vector in accordance with an arc cosine function.

In another aspect of the subject matter described in this specification, an article includes a computer-readable data storage medium storing program code operable to cause one or more machines to perform operations including receiving first data indicating a gesture template; modifying the first data to form a first vector representation; saving the first vector representation; receiving second data indicating a gesture input in a user interface; modifying the second data to form a second vector representation; calculating an adjustment angle using both the first and second vector representations as input; and generating a score of similarity between the first and second vector representations, taking the adjustment angle into account, to assess whether the gesture input matches the gesture template.

The generating can include generating the score of similarity, S, in accordance with a first equation, $$S(t, g) = \frac{1}{\arccos \frac{v_t \cdot v_g}{|v_t||v_g|}},$$

where $v_t$ corresponds to the first vector representation, t, and $v_g$ corresponds to the second vector representation, g; and the calculating can include calculating the adjustment angle, $\theta_{optimal}$, in accordance with a second equation, $$\theta_{optimal} = \arctan \frac{b}{a}, \text{ where}$$

$$a = v_t \cdot v_g = \sum_{i=1}^{n} (x_{ti} x_{gi} + y_{ti} y_{gi}), \text{ and } b = \sum_{i=1}^{n} (x_{ti} y_{gi} - y_{ti} x_{gi}).$$

The calculating can include calculating the adjustment angle in accordance with an arc tangent function; and the generating can include generating the score of similarity in accordance with an arc cosine function.

Taking the adjustment angle into account can include rotating the first vector representation by the adjustment angle, at runtime, before generating the score of similarity. Modifying the first data and modifying the second data can each include modifying input data by performing operations including: resampling the input data into a fixed number, N, equidistantly-spaced points, translating the points to place a centroid of the points at an origin of a coordinate space, determining whether the input data is to be considered orientation invariant, rotating the translated points around the centroid in accordance with an indicative angle of the translated points, if the input data is orientation invariant, to define an input vector, and aligning the translated points with one of multiple base orientations in the coordinate space, if the input data is not orientation invariant, to define the input vector.

The operations can include assessing whether the gesture input matches the gesture template based on the score of similarity, where the assessing includes: combining the score of similarity with an additional score of similarity, between the second vector representation and an additional vector representation of additional data indicating the gesture template, to form a composite similarity score; and comparing the composite similarity score with one or more other similarity scores corresponding to other gesture templates to find a closest match.

In another aspect of the subject matter described in this specification, a system includes a graphical display to present at least a portion of a graphical user interface, and a computing device including a gesture recognizer to receive user traces obtained with respect to the graphical display and to identify a user gesture in a received user trace in accordance with a process; where the user gesture corresponds to a predefined gesture that is a valid input to the graphical user interface, the predefined gesture is represented by one or more previously received user traces, and the process correlates the received user trace with the one or more previously received user traces by employing a closed-form solution to find one or more rotations that reduce angular distance between the received user trace and respective ones of the one or more previously received user traces.

The gesture recognizer can be programmed to perform the process including: modifying the one or more previously received user traces to form one or more first vector representations; modifying the received user trace to form a second vector representation; calculating an adjustment angle, for each of the one or more first vector representations, using data of the second vector representation and data of the first vector representation as input; generating a score of similarity, for each of the one or more first vector representations, taking each respective adjustment angle into account.

The generating can include generating the score of similarity, S, in accordance with a first equation, $$S(t, g) = \frac{1}{\arccos \frac{v_t \cdot v_g}{|v_t||v_g|}},$$

where $v_t$ corresponds to the first vector representation, t, and $v_g$ corresponds to the second vector representation, g; and the calculating can include calculating the adjustment angle, $\theta_{optimal}$, in accordance with a second equation, $$\theta_{optimal} = \arctan \frac{b}{a}, \text{ where}$$

$$a = v_t \cdot v_g = \sum_{i=1}^{n} (x_{ti} x_{gi} + y_{ti} y_{gi}), \text{ and } b = \sum_{i=1}^{n} (x_{ti} y_{gi} - y_{ti} x_{gi}).$$

The calculating can include calculating the adjustment angle in accordance with an arc tangent function; and the generating can include generating the score of similarity in accordance with an arc cosine function.

Taking the adjustment angle into account can include rotating the first vector representation by the adjustment angle, at runtime, before generating the score of similarity. Modifying the one or more previously received user traces and modifying the received user trace can each include modifying input data by performing operations including: resampling the input data into a fixed number, N, equidistantly-spaced points, translating the points to place a centroid of the points at an origin of a coordinate space, determining whether the input data is to be considered orientation invariant, rotating the translated points around the centroid in accordance with an indicative angle of the translated points, if the input data is orientation invariant, to define an input vector, and aligning the translated points with one of multiple base orientations in the coordinate space, if the input data is not orientation invariant, to define the input vector. Moreover, the system can include a mobile phone including the graphical display and the computing device, and the graphical display can include a touchscreen display device.

The details of one or more embodiments are set forth in the accompanying drawings and the description below. Other features and advantages will be apparent from the description and drawings, and from the claims.

DETAILED DESCRIPTION

This document describes systems and techniques that can be used to recognize user input to a computing device, such as a mobile telephone having a touchscreen user interface, in order to facilitate interaction with the user. Such interaction may occur by a mobile device responding to user entries of simple characters, or glyphs, that in many instances may be in the form of Roman/Latin alphabet characters. Characters from other alphabets and symbols from different sets may also be used, including entirely made up symbols defined by a particular user. All such symbols, characters or glyphs can be referred to generally as gestures, which can be recognized by a computing device and acted thereon.

Figure 1:
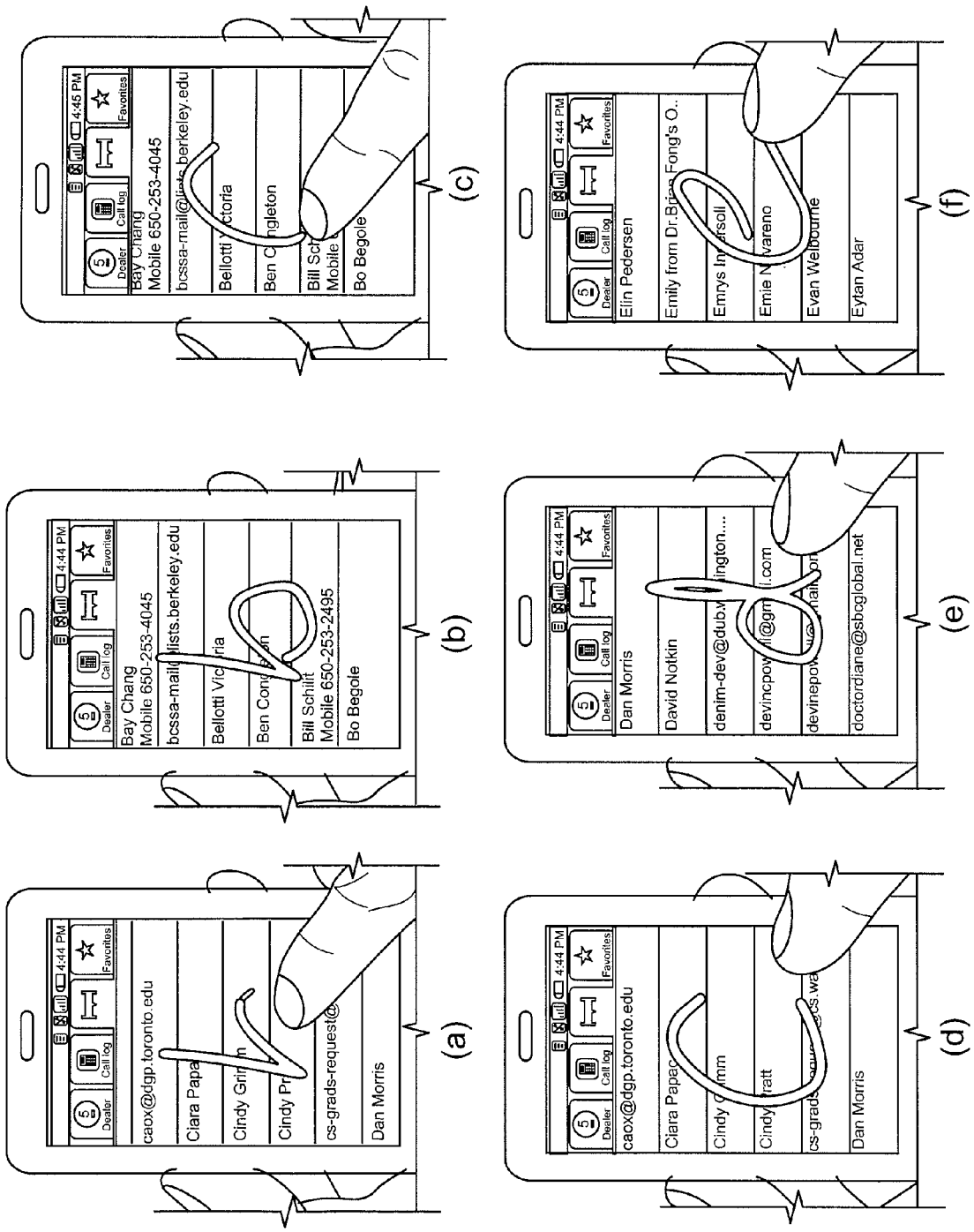
FIG. 1 shows a series of screenshots of a mobile touchscreen device scrolling to a location in a list corresponding to a user-entered gesture corresponding to a character.

An important topic in gesture-based interaction is recognizing gestures, such as 2D trajectories drawn by users with their finger on a touchscreen or with a pen, so that a computer system can act based on recognition results. Such gesture recognition can be used with many different types of user interfaces and to realize many different types of user interface functionality. As one example, FIG. 1 shows a series of screenshots of a mobile touchscreen device scrolling to a location in a list corresponding to a user-entered gesture corresponding to a character. In general, the screenshots are of displays of a mobile computing device in the form of a mobile smart phone and a user entering various alphabetic glyphs onto a the touchscreen of the device. Each of the six screenshot shows a different display during a sequence of user inputs.

The display designated by letter (a) shows a user looking at a contact list on his device. The contact list is sorted alphabetically, and, at the beginning of the action, is parked on names beginning with the letter "C." As can be seen, the user is in the process of tracing a lower case "b" on the screen, and the character is being mimicked on the display as the user traces. At the display designated by the letter (b), the user has finished tracing the letter, and one can see that the list of names has jumped automatically to names beginning with the letter "B", corresponding to the letter traced by the user, with the first alphabetical B name at the top of the list. Thus, the device has recognized that the user's traced glyph matched a representation of the alphabetical "b", and caused the display to jump to that location in the list.

At the display designated by the letter (c), the user has decided that they would like to see entries that begin with the letter "C", and thus they have begun tracing that letter onto the screen of the device. As can be shown, the display repeats their entry as they enter it, and at the display indicated by the letter (d), the letter "C" has been completed as the user lifts his finger from the touchscreen surface. At that point, the device determines that the user's entry is complete and interprets the largely circular, though open, entry as the letter "C", and immediately and automatically scrolls the list to the entries that begin with the letter "C."

The user continues his entries at the displays marked by the letters (e) and (f), entering the alphabetic characters "d" and "e", respectively. At each entry, the list scrolls to the entries that start with the character that the user has entered.

As shown, the user entry occurs right over the display area where the application that displays the list is providing the displayed components. As such, the entry of glyphs may need to be distinguish from other data entry that may occur in the same area. Thus, the device may need to recognize a user's intent to enter a glyph before moving forward with recognizing the glyph itself.

For example, entry of a character on a long list may need to be distinguished from user entries that are intended to cause the list to scroll. Such distinctions may be made in a variety of manners. For example, a bounding box may be constructed around any initial vertical input (where the list scrolls vertically) or a portion of the initial vertical input, and the aspect ratio of the bounding box may be used to infer the user's intent—where a wider bounding box would indicate an intent to enter a glyph rather than to scroll. The bounding box may, but need not be, orthogonal to the edges of the screen on which the entry occurred. Because the technique uses the minimum bounding box of a motion, it can effectively separate scrolling from glyph drawing. For example, a scrolling motion might not be entirely vertical—many are in fact diagonal or slightly diagonal. Or a user may scroll a list up and down without lifting the finger, which causes a zig-zag motion. All these will still result in a "narrow" bounding box, i.e., a low aspect ratio in this context.

The bounding box might also be checked only if the initial stroke exceeds a predetermined minimum length, where it is assumed that very short user movements would not indicate the intent to enter a character because they would be too small in relation to the canvas presented to a user by a touchscreen.

Also, the speed of the original dragging motion may be considered, where a fast flick would indicate an intent to scroll, whereas a slower entry would indicate a more deliberate intent to enter a glyph. Other speed data or combinations of speed data may also be used. For example, a very slow vertical motion may indicate an intent to scroll a very small amount in a list, whereas a very fast movement may indicate an intent to flick the list, while a middle range of speeds may indicate an intent to enter a glyph. Also, if a system is program with no glyphs that have vertical elements, any vertical input can immediately be assumed to indicate an intent to scroll. The scrolling may also be suppressed while an initial determination is made of whether the input is intended to be a glyph entry or a scrolling entry, or may begin and may continue during the entry of the glyph, and then the device can jump, as part of the scrolling, to the part of the list represented by the character that corresponds to the entered glyph, once the glyph entry is completed by the user.

Also, the entered character may be recognized while it is being entered, or only after its entry is complete. The latter recognition may be triggered by a "pointer up" event on the touchscreen, while the former may involve continually providing tracing information to a recognizer as the glyph is being entered, and comparing the entered data to a set of possible solutions until all but one solution have been ruled out. At that point, the recognition may be made, even if the user has not yet completed his or her entry. The display of a line that follows the tracing of the user's finger may be dimmed initially, while the device is determining whether the entry is of a glyph or is for scrolling, and may be made brighter, thicker, and/or a different color once a determination is made that the user's intent is to enter a glyph.

A determination of user intent may also include determining a level of pressure applied by the user, either apart from, or in combination with, other determinations such as an angle of a beginning vertical stroke and the speed of the stroke. For example, a very light and fast user entry may indicate a flick, and an intent to scroll quickly. Higher pressure may indicate more deliberate entry, in that the user is trying to trace out a character or other glyph and thus intends to draw an input rather than to scroll.

As will be appreciated, the techniques described above to determine user intent can be employed as part of an initial stage of a multi-stage process. For example, in a first stage, gesture trajectories can be analyzed immediately and incrementally as being drawn (e.g., while using bounding boxes plus lengths, as described), and in a second stage, a more involved gesture recognition process can be performed.

Although many sophisticated gesture recognition algorithms have been developed, simple, template-based recognizers often show advantages in personalized, gesture-based interaction, e.g., end users defining their own gesture shortcuts for invoking commands. Template-based recognizers typically use a nearest neighbor approach in which training samples are stored as templates, and at runtime, an unknown gesture is compared against these templates. The gesture category (or the label) with the most similar template is used as the result of recognition, and the similarity implies how confident the prediction is. These template-based recognizers often perform limited featurization, and a stored template often preserves the shape and sequence of a training gesture sample to a large degree. These recognizers are also typically purely data-driven and do not assume a distribution model that the target gestures have to fit. As a result, they can be easily customized for different domains or users, as long as training samples for the domain or user are provided.

In contrast, recognizers that employ a parametric approach often operate on a highly featurized representation of gestures and assume a parametric model that the target gestures have to fit. For example, the Rubine Recognizer (as described in Rubine, D., Specifying gestures by example. ACM SIGGRAPH Computer Graphics, 1991. 25(4): p. 329-337) extracts a set of geometric features from a gesture such as the size of its bounding box. It uses a linear discriminate approach to classify gestures that assumes the featurized gestures to be linearly separable. These parametric recognizers can perform excellently when the target gestures truly fit the assumed model. However, if not, these recognizers may perform poorly.

For personalized, gesture-based interaction, it is hard to foresee what gestures an end user would specify and what the distribution of these gestures will look like. For example, the user may be permitted to assign his or her own glyphs to various different objects in an operating system or applications running in an operating system, and a user may use such personalized glyphs to navigate to an object, such as a contact, a song, another type of media file, or other similar object. The user may select a control associated with the object to indicate an intent to assign a glyph to the object, and may then be instructed to draw the glyph on the display of the computing device. The glyph may appear as they draw it so that they can confirm that they want the glyph they have drawn to be assigned (or they can choose to re-draw the glyph). When the user is later using the device, they may draw the glyph that they have created in order to jump to the object. In certain circumstances, the glyph can be drawn in any location on the device and may be resolved to the object, while in others, the glyph may be resolved only if the device is in a certain context (e.g., a glyph for a location in a particular application may be available only while the application is active).

Figure 2:
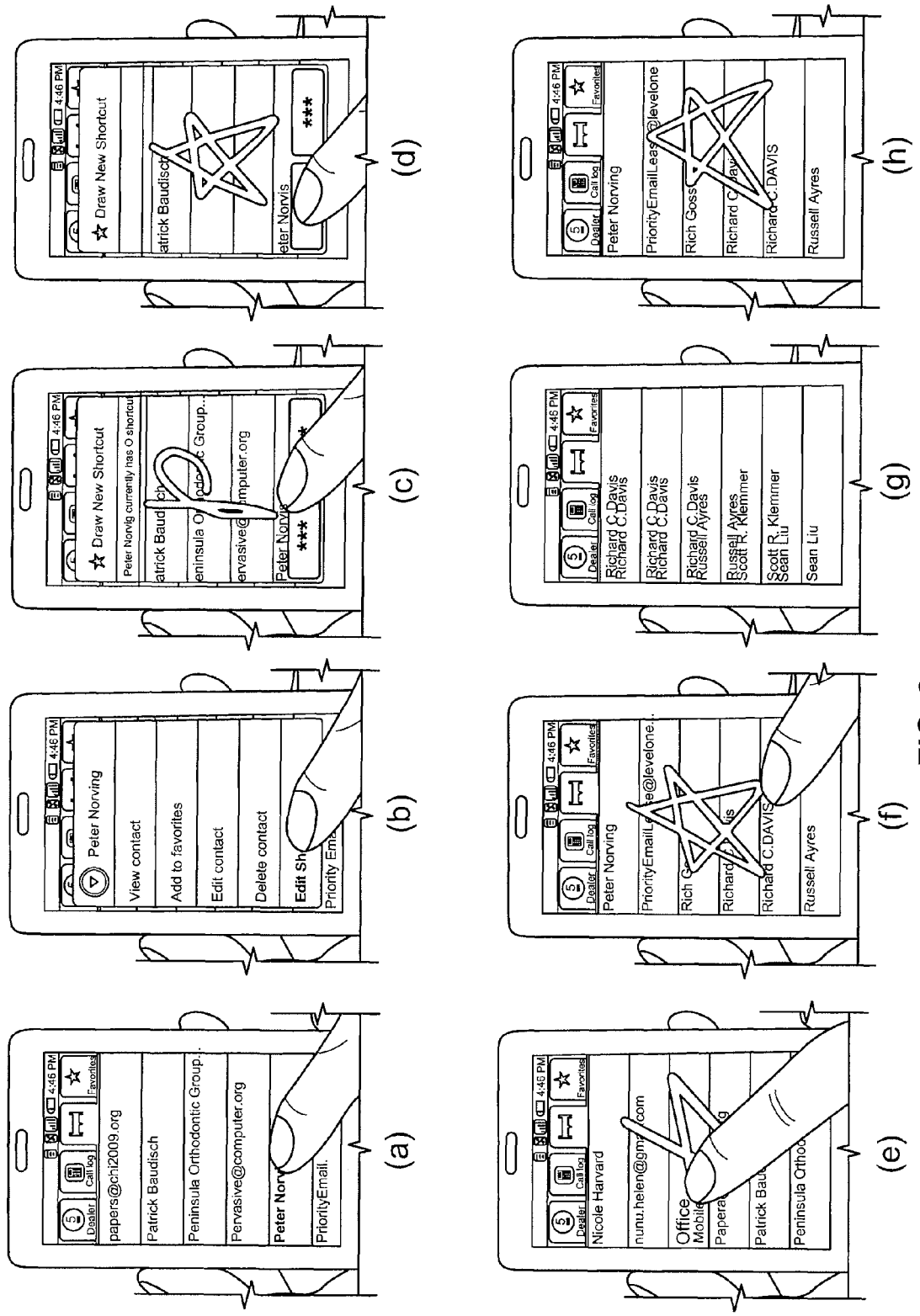
FIG. 2 shows a series of screenshots of a mobile touchscreen device being programmed with custom glyphs.

FIG. 2 shows a series of screenshots of a mobile touchscreen device being programmed with custom glyphs. Generally, the screenshots show mobile device displays in which a user is entering custom, user-defined glyphs for reaching a user interface item in the form of a contact record for someone who is a friend of the user. Again, each of the screenshots occurs chronologically after the prior screenshot.

The first display, designated with the letter (a), shows a user long pressing on a name of a friend in an alphabetical list of the user's contacts. Such a selection brings up the multi-part menu shown in the display designated with the letter (b), where the user is presented with the options of viewing the contact (e.g., seeing a photo of the friend, along with one or more telephone numbers and e-mail addresses), adding the friend to a list of favorites (which is a sub-list of all the objects of this type that a user may have on their device, and that can be presented to the user more conveniently than could a list of all the objects on the device), editing a contact (by showing the contact information to the user and allowing the user to change it), deleting the contact, and editing a shortcut to the contact. In the image, the user is clicking or long clicking on the option to edit a shortcut for the object or item of the friend's contact record.

The selection of that option by the user has led to the display designated with the letter (c), where a partially transparent canvas has been displayed over the menu, along with instructions for the user to draw or trace a glyph whose entry will thereafter be correlated with the contact record for the friend. (In the line drawing of the figure, the canvas is fully transparent, though actual implementations may use various visual effects to allow the user to maintain a sense of place in the system while they are entering a character.) In the display, the user is tracing a letter "P," presumably because the friend's first name begins with the letter "P"—therefore, a natural memory crutch for the user in remembering the appropriate glyph for the friend later.

At the display represented by the letter (d), the user has selected the menu "edit short cut" again for the same friend's contact record, and is in the process of drawing a glyph in the form of a standard 5-pointed star—perhaps because the user knows that the friend has always excelled at all that he has done, and is thus a star performer. The user is also in the process of pressing an "add" button so as to add the star glyph as one of the representations for the friend, in addition to the traced letter "P."

At the display represented by the letter (e), the user has returned to the list of contacts where this process started in display (a), and is in the process of tracing the 5-pointed star, and at the display represented by the letter (f), the entry of the star glyph is complete, has been interpreted by the device as matching the glyph entered by the user in display (d). In the display represented by letter (g), the user has flicked the display to induce it to scroll to another letter (where the vertical flick has been distinguished from the entry of a letter or other glyph), and then has caused it to return to the record that represents the friend's contact by re-entering the five-pointed star at the display represented by the letter (h). (The double display of some entries in the figure represents the blurred motion of those entries as fast scrolling occurs.)

In certain circumstances, standard glyphs may be mixed with custom glyphs. Standard glyphs are glyphs that are assigned by a third party such as a software developer, while customized glyphs are drawn by a user of the device himself. Thus, for example, a standard glyph may be used to represent locations in alphanumeric lists like music lists and contact lists, while custom glyphs may be used to represent particular objects that are unique to a user's device. The user may also create multiple glyphs for a particular object, so that, for example, they could assign characters from a non-English alphabet to cause scrolling of lists according to entry of such characters, where the lists would scroll to the location of the equivalent English character in the list.

The standards for identifying standard glyphs may be looser than those for identifying custom glyphs. In particular, standard glyphs are developed to be used by many different people and thus may need to be recognized across a greater level of variation, whereas custom glyphs are draw by a particular user and thus may be assumed to have a greater degree of repeatability. Thus, the prevalence of false positive recognitions may be reduced for custom glyphs by "dialing down" the level of variability allowed for such glyphs.

It should be noted that an end user is often willing to provide only a small number of training samples, e.g., one sample per gesture category. This can result in difficulties for training a parametric recognizer that often has a high degree of freedom with such sparse training data. In contrast, template-based recognizers are well suited for this situation. However, since a template-based recognizer typically needs to compare an unknown gesture with all of its stored templates to make a prediction, it can be both time and space consuming, especially for mobile devices that have limited processing power and memory.

Figure 3:
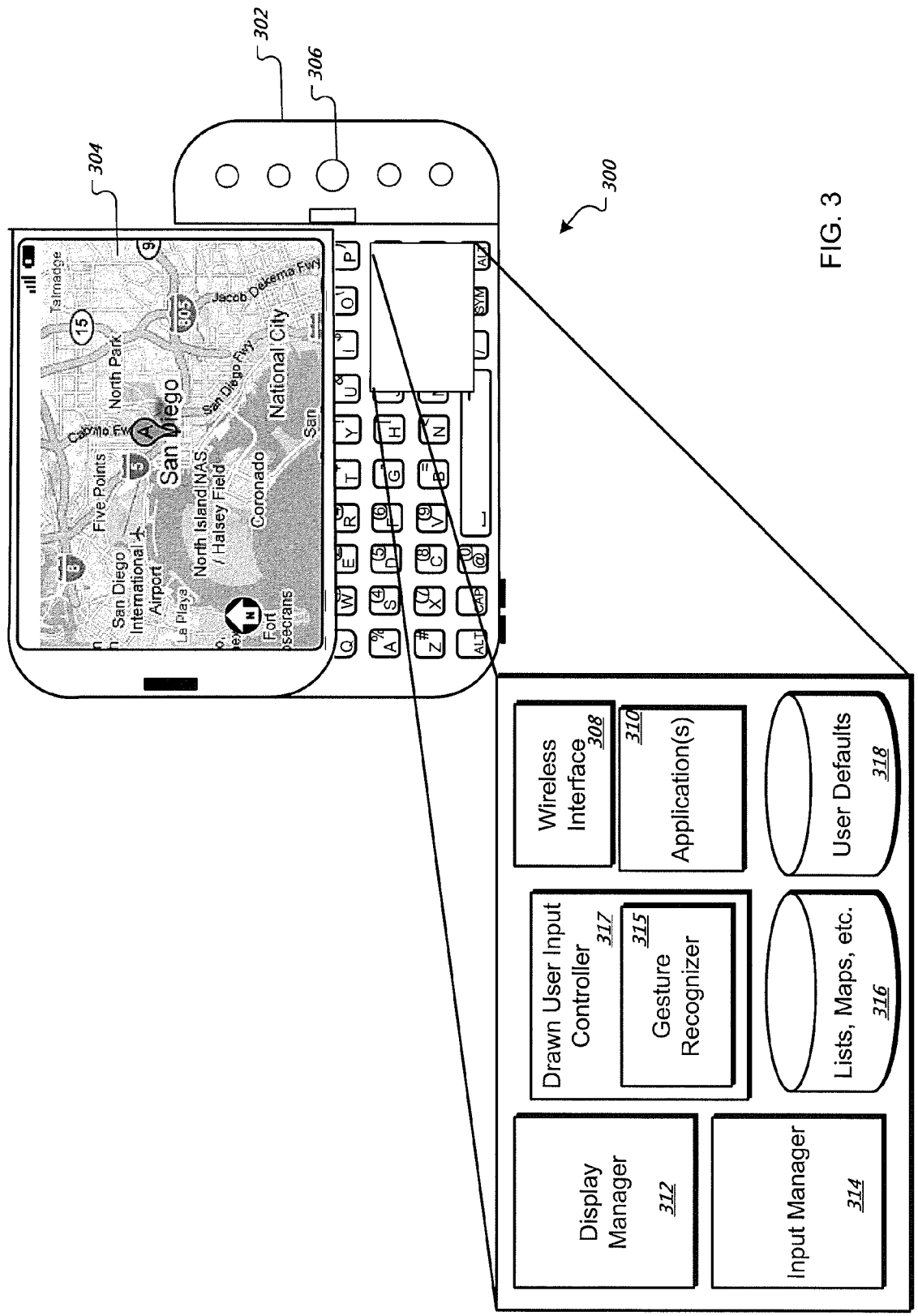
FIG. 3 is a schematic diagram of a system that provides user interaction in response to touchscreen inputs.

FIG. 3 is a schematic diagram of a system 300 that provides user interaction in response to touchscreen inputs. The system 300 may be implemented using a mobile device such as device 302. The device 302 includes various input and output mechanisms such as a touchscreen display 304 and a roller ball 306. A number of components within device 302 may be configured to provide various selection functionality on display 304, such as by the drawing of one or more glyphs on the display 304.

One such component is a display manager 312, which may be responsible for rendering content for presentation on display 304. The display manager 312 may receive graphic-related content from a number of sources and may determine how the content is to be provided to a user. For example, a number of different windows for various applications 310 on the device 304 may need to be displayed, and the display manager 312 may determine which to display, which to hide, and what to display or hide when there is overlap between various graphical objects. Also, when another component of the device 304 recognizes that a user is trying to draw a glyph on a touchscreen display, the display manager may help coordinate the generation of the glyph on the display at the locations where the user has drawn.

The display manager 312 can include various components to provide particular functionality for interacting with displayed components, which may be shared across multiple applications, and may be supplied, for example, by an operating system of device 302. Entry of gestures over other displayed components may be managed, in coordination by the display manager 312, using a drawn user input controller 317. Such a controller may be responsible for recognizing when a user is entering a glyph rather than performing a different function on the display, and for changing the input glyph into a command that can be interpreted by other components on the device. To produce such commands, the drawn user input controller 317 may refer to a gesture recognizer 315, by passing to the gesture recognizer 315 information defining the shape of a gesture that was entered by a user. The gesture recognizer 315 may then compare the entered gesture to both standard and custom templates that are stored on the device, and return the identity of the gesture, such as a glyph ID number.

The drawn user input controller 317 may have previously mapped and stored the glyph ID's and actions that are to occur when a particular glyph is entered. As a result, the controller 317 may pass such information to other components of the device. For example, various applications 310 may be stored on and run on the device. Where, for example, the controller 317 represents a glyph that has been correlated to a contact record, the controller 317 may call the contact application and pass it the identity of the record so that the record will automatically be displayed in response to a user's entry of the glyph. In this manner, the controller 317 can act as a sort of intervener between core components of the operating system, and with applications on the device.

An input manager 314 may be responsible for translating commands provided by a user of device 302. For example, such commands may come from a keyboard, from touchscreen display 304, from trackball 306, or from other such sources, including dedicated buttons or soft buttons (e.g., buttons whose functions may change over time, and whose functions may be displayed on areas of display 304 that are adjacent to the particular buttons). The input manager 314 may determine, for example, in what area of the display commands are being received, and thus in what application being shown on the display the commands are intended for. In addition, it may interpret input motions on the touchscreen 304 into a common format and pass those interpreted motions (e.g., short press, long press, flicks, and straight-line drags) to the appropriate application. The input manager 314 may also report such inputs to an event manager (not shown) that in turn reports them to the appropriate modules or applications. The input manager may pass inputs in the area of a soft keyboard to an Input Method Editor (IME) when IME functionality is activated for a device.

The controller 317 may register with the input manager 314 so as to be informed about user inputs on the touchscreen, and may in turn inform the input manager 314 when it has recognized a particular input as being a drawn input, so as to prevent the input manager 314 from passing the input to other components that may interpret it inaccurately as being something else.

A variety of applications 310 may operate, e.g., on a common microprocessor, on the device 302. The applications 310 may take a variety of forms, such as mapping applications, e-mail and other messaging applications, web browser applications, music and video players, and various applications running within a web browser or running extensions of a web browser. The applications 310 may include applications that store records or other components having alphanumeric names, and that can thus be accessed quickly by a user drawing an alphanumeric character on the front of the touchscreen 304.

A wireless interface 308 manages communication with a wireless network, which may be a data network that also carries voice communications. The wireless interface 308 may operate in a familiar manner, such as according to the examples discussed below, and may provide for communication by the device 302 with messaging services such as text messaging, e-mail, and telephone voice mail messaging. In addition, the wireless interface 308 may support downloads and uploads of content and computer code over a wireless network.

Various forms of persistent storage may be provided, such as using fixed disk drives and/or solid state memory devices. Two examples are shown here. First, a lists, maps, etc. storage 316 includes various definitions for objects that may be stored on and presented by the device 302. Such objects include lists of other objects, such as lists of songs, television shows, movies, or other media on the device. The lists may also include lists of file names where the device 302 stores a large number of files. Also, other objects such as maps may be stored (e.g., as graphical map tiles that can be pre-fetched from a remote server), and meta data about the maps, such as the names of towns and streets on a map, along with the names of points of interest and business on the maps.

Other storage includes user defaults 318, which may be profile information for a user stored on the same media as the lists, maps, etc. 316. The user defaults 318 include various parameters about a user of the device 302. In addition, the user profile may include data defining various custom gesture templates that the user has entered, along with objects or actions to be associated with the entry of those gestures. Gesture data and other information may be stored in a variety of forms, such as in one or more XML files or in Sqlite files.

Using the pictured components, and others that are omitted here for clarity, the device 302 may provide particular actions in response to user inputs. Specifically, the device 302 may respond to inputs by a user by recognizing an input as being a gesture shortcut, and for responding to such data entry by jumping a device to a location or object associated with the gesture.

The device 302, and in particular the gesture recognizer 315, can employ a nearest neighbor approach for gesture recognition. For each gesture (either it is an unknown gesture or a training sample), the gesture recognizer 315 can preprocess it into an equal-length vector. Given an unknown gesture, the gesture recognizer 315 can search for similar gesture templates by calculating an optimal angular distance between the unknown gesture and each of the stored templates. The gesture recognizer 315 can use a closed-form solution to calculate such a distance, which can result in significant improvements in accuracy and speed. The gesture recognizer 315 can also recognize gestures that are both invariant and sensitive to orientation, as well as gestures with different aspect ratios.

Figure 4A:
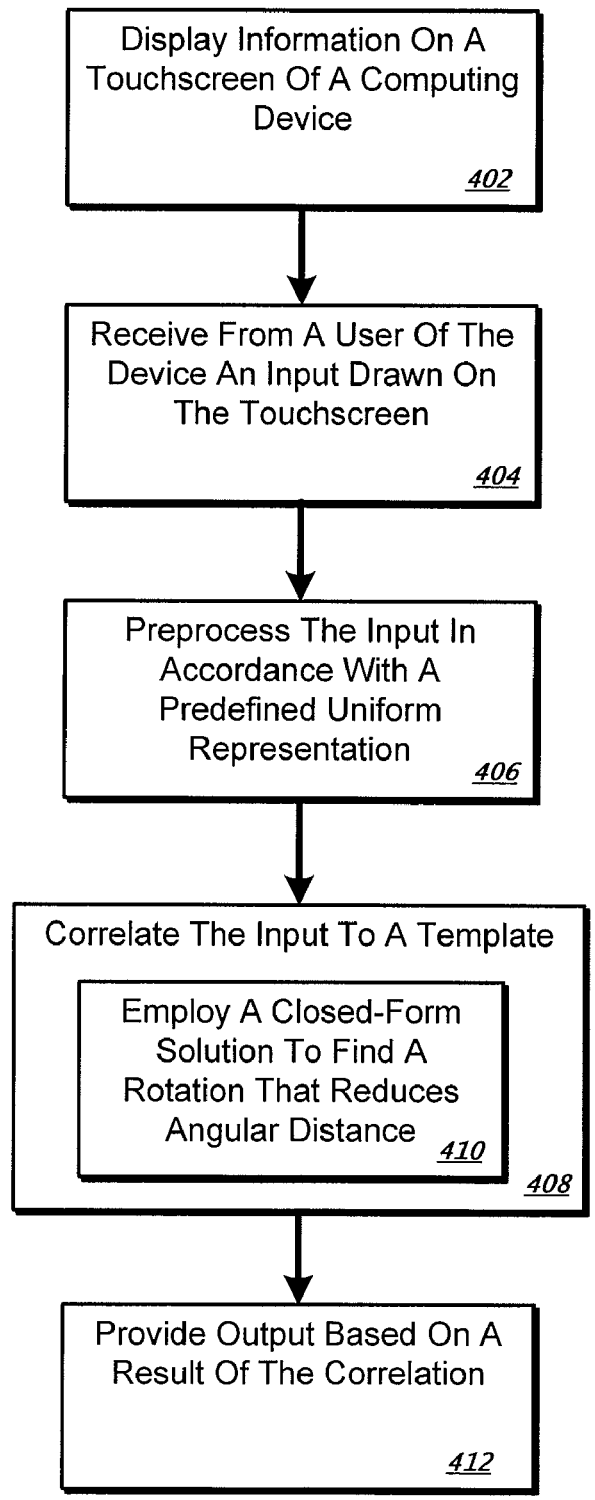
FIG. 4A is a flow chart showing an example of a process for handling gesture recognition on a computing device.

FIG. 4A is a flow chart showing an example of a process for handling gesture recognition on a computing device. Information is displayed 402 on a touchscreen of a computing device. This can involve providing output data to another system component that renders the output data to a display screen. The information can be a portion of a graphical user interface. Moreover, in some implementations, a touchscreen need not be used.

An input drawn on the touchscreen is received 404 from a user of the device. This can involve receiving data from another system component, where the data defines a user trace on the touchscreen made with a pen, the user's finger, or other input tool. The touchscreen can employ multi-touch technology. In addition, in other implementations, the input can be drawn using an input device other than a touchscreen, such as a finger joystick, touch pad, mouse, or other input device that allows a user to enter a gesture input.

The input can be preprocessed 406 in accordance with a predefined uniform representation. This can involve resampling the input into a set of points, translating the points, determining whether the input is to be considered orientation invariant, and rotating or aligning the translated points based on the determining. This preprocessing can be performed independently on both the gesture input and the gesture template to convert them into a uniform vector representation of gestures in the computing device. Further details of such preprocessing are described below in connection with FIG. 4C.

The input is correlated 408 to a template. This correlation 408 involves employing 410 a closed-form solution to find a rotation that reduces angular distance between the input and the template. The correlating 408 can include finding an angle, in accordance with an arc cosine function, between a vector representation of the input and a vector representation of the template in an N-dimensional space to generate a similarity score. In addition, the employing 410 can include calculating, in accordance with an arc tangent function, the rotation from data consisting of the vector representation of the input and the vector representation of the template. Further details regarding processing in accordance with the arc cosine function and the arc tangent function are described below in connection with FIG. 4B.

Output is provided 412 based on a result of the correlating 408. This can involve providing a similarity score to another system component for use in assessing whether the input matches the template. Assessing whether the input matches the template can involve comparing multiple similarity scores that indicate a degree of similarity between the input and multiple templates that are associated with different actions or objects in a user interface, and selecting the highest similarity score for a match. Thus, providing 412 the output can also involve indicating a match has been found, or initiating an action or affecting an object in a user interface in response to a match.

In addition, assessing whether the input matches the template can involve checking that the score surpasses a threshold. The specific value for the threshold may depend on the specific gesture data set. In some implementations, a Receiving Operator Characteristics (ROC) curve can be used to decide the threshold such that the threshold results in a high true positive rate and a low false positive rate.

Figure 4B:
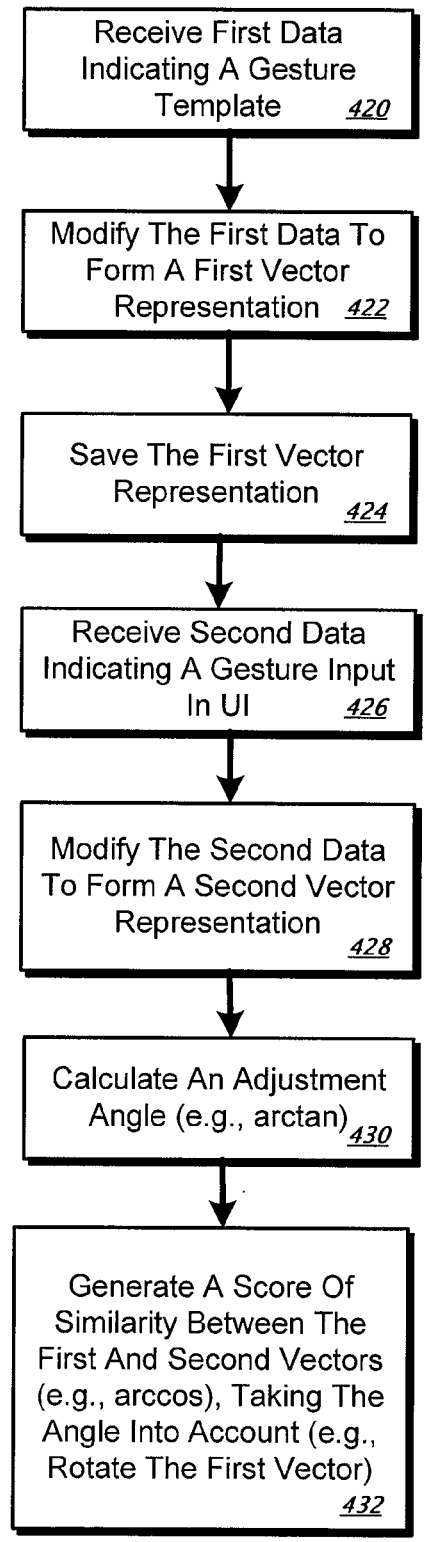
FIG. 4B is a flow chart showing another example of a process for handling gesture recognition on a computing device.

FIG. 4B is a flow chart showing another example of a process for handling gesture recognition on a computing device. First data indicating a gesture template is received 420. This first data can be preprogrammed gesture data, which can be provided by the device manufacture, an application developer, etc. Alternatively, this first data can be user entered gesture data, which will serve as a basis for a user-defined gesture template.

The first data can be a 2D trajectory of data points with virtually no limit on data amount or resolution. The first data is modified 422 to form a first vector representation. This vector representation conforms the first data to a predefined uniform representation (e.g., a fixed number, N, of equidistantly-spaced points) to make it readily comparable to other gesture data. The equidistantly-spaced points can have a distance between each two points defined as the path length of a stroke divided by (N−1). This process is intended to remove irrelevant factors, such as different drawing speeds, different gesture locations on the screen, and noise in gesture orientation. Further details of an example process for this modification are described below in connection with FIG. 4C.

Note that the process described in connection with 4C is generally applicable to gesture template data as well as gesture input data. However, it will be appreciated that when the first data is preprogrammed gesture data, some or all of the preprocessing need not be performed, depending on the nature of the received gesture template data. For example, the received gesture template data may already be centered and oriented, which may eliminate any need to translate or rotate the data as part of its preprocessing. In any event, the received gesture template data (whether provided by a user or other source) and the received user gesture input data can be processed, as appropriate, in accordance with a predefined uniform representation to make them readily comparable with each other.

The first vector representation is saved 424. This can involve storing the first vector representation in long term storage (e.g., a hard disk drive built into the device), saving the first vector representation in temporary memory (e.g., volatile random access memory (RAM) in the device), or both. The saved first vector representation is then available for later processing at the time of gesture recognition.

Second data indicating a gesture input in a user interface is received 426. As described above, this can be user input provided in any of a number of manners to any of a number of programs operating on a computing device. The second data can be received all at once, as when another device component or program has determined that the user input is some kind of gesture input and passes the full data set to a gesture recognizer. Alternatively, the second data can be received as it is being input, such as when a gesture recognizer operates in parallel with another device component or program to assess the user input as it is received. Moreover, as with the first data, the second data can be a 2D trajectory of data points with virtually no limit on data amount or resolution.

The second data is modified 428 to form a second vector representation. This second vector representation conforms the second data to the predefined uniform representation (e.g., a fixed number, N, of equidistantly-spaced points) to make it readily comparable to the gesture templates saved in the device. Again, this process is intended to remove irrelevant factors, such as different drawing speeds, different gesture locations on the screen, and noise in gesture orientation. Further details of an example process for this modification are described now in connection with FIG. 4C.

Figure 4C:
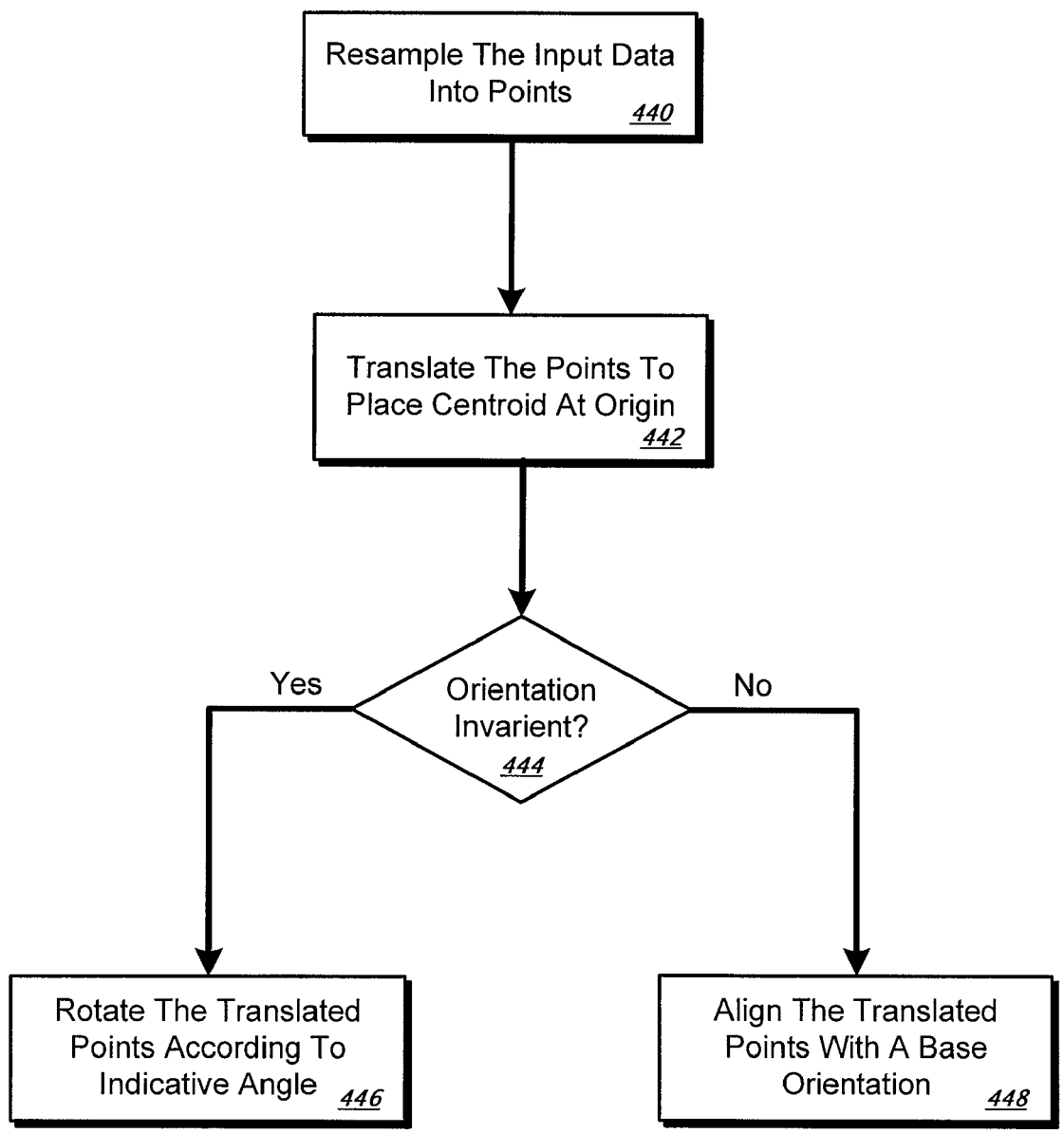
FIG. 4C is a flow chart showing an example of a process for preprocessing input data representing a gesture in accordance with a predefined uniform representation.

FIG. 4C is a flow chart showing an example of a process for preprocessing input data representing a gesture in accordance with a predefined uniform representation. The input data is resampled 440 into a fixed number, N, equidistantly-spaced points. This can be done using the procedure described in Wobbrock, J. O., et al., Gestures without libraries, toolkits or training: a $1 Recognizer for user interface prototypes, UIST'07. 2007. p. 159-168 (hereafter "$1 Recognizer").

The points are translated 442 to place a centroid of the points at an origin of a coordinate space. By moving the centroid of the points to become (0, 0), variations in drawing speeds and locations on a screen can be removed. Then, noise in gesture orientation can be removed.

A determination is made 444 as to whether the input data is to be considered orientation invariant. The orientation information of a gesture can be useful or irrelevant, depending on the application. The systems and techniques described here can give the developer an option to specify whether it should work in an orientation-invariant or orientation-sensitive way. The determination 444 can involve checking an input signal that indicates whether the input data is to be considered orientation invariant based on a given UI context, current gesture template being compared, or a combination of these. Moreover, a gesture recognizer built in accordance with the presently described systems and techniques can be data-driven, such that it can become orientation-invariant even if it is specified to be orientation-sensitive. For example, if a user provides gesture samples for each direction for the same category.

If the input data is orientation invariant, the translated points can be rotated 446 around the centroid in accordance with an indicative angle of the translated points to define an input vector. The indicative angle can be defined as the direction from the centroid to the first point of the resampled gesture (see e.g., $1 Recognizer), or other indicative angles can be used. This way, all of the preprocessed gesture representations have zero indicative orientation.

However, when the gesture recognizer is specified to be orientation sensitive, it can employ a different procedure to remove orientation noise. If the input data is not orientation invariant, the translated points are aligned 448 with one of multiple base orientations in the coordinate space to define the input vector. This can involve aligning the indicative orientation of a gesture with the one of eight base orientations that requires the least rotation.

Figure 5:
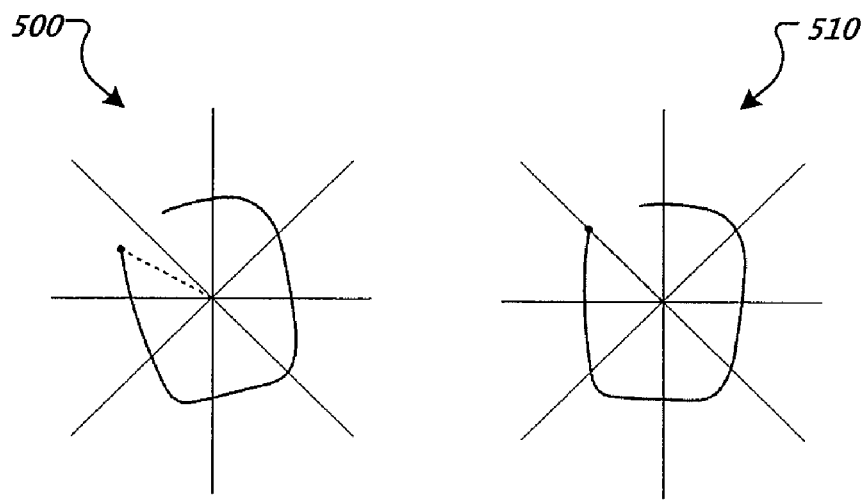
FIG. 5 shows an example of aligning translated points with one of multiple base orientations in a coordinate space, as part of preprocessing input data representing a gesture.

FIG. 5 shows an example of aligning translated points with one of multiple base orientations in a coordinate space, as part of preprocessing input data representing a gesture. As shown in FIG. 5, in this example, there are eight base orientations at 0°, 45°, 90°, 135°, 180°, 225°, 270°, and 315°. An initial orientation 500 is thus rotated to an aligned orientation 510. The indicative angle used for the alignment can be defined as the direction from the centroid to the first point of the resampled gesture (as shown in FIG. 5), or other indicative angles can be used. The eight orientations are often considered the major gesture orientations. However, in some embodiments, fewer or more base orientations can be used.

Returning to FIG. 4B, the first and second vector representations are equal length vectors that can each be represented in the form $(x_1, y_1, x_2, y_2, \ldots, x_N, y_N)$. For each gesture, the preprocessing only needs to be done once. While various values of N can be used, N=16 can give a gesture recognizer enough resolution for later classification while also keeping the needed processing and memory resources low. 16 points amount to a 32-element vector for each gesture, which is ¼ of the space required by some previous work for storing a template. Note that the resampled points need not be rescaled to fit a square, which preserves the aspect ratio of a gesture and also makes it possible to recognize narrow (or 1-dimensional)

gestures such as horizontal or vertical lines. Rescaling these narrow gestures to a square can seriously distort them and amplify the noise in trajectories.

An adjustment angle is calculated 430 using both the first and second vector representations as input. This can involve calculating the rotation in accordance with an arc tangent function, such as describe further below. A score of similarity between the first and second vector representations is generated 432 (e.g., calculating a similarity score from the input vector and the template vector in accordance with an arc cosine function) to assess whether the gesture input matches the gesture template, where this generation 432 of the score of similarity includes taking the adjustment angle into account.

Based on the vector representation of gestures acquired, a search can be performed for templates that are similar to the unknown gesture. To do so, for each pairwise comparison between a gesture template t and the unknown gesture g, the inverse cosine distance between their vectors, $v_t$ and $v_g$, can be used as the similarity score S of t to g, as shown in Equation (1) below.

$$S(t, g) = \frac{1}{\arccos \frac{v_t \cdot v_g}{|v_t||v_g|}} \quad (1)$$

Other similarity score equations can be used that include the cosine distance. The cosine distance essentially finds the angle between two vectors in an n-dimensional space.

As a result, the gesture size, reflected in the magnitude of the vector, becomes irrelevant to the distance. So this approach to measuring similarity is scale invariant. The cosine distance of two vectors is represented by the dot product of the two vectors (see Equation (2) below) divided by the multiplication of their magnitudes (see Equation (3) below).

$$v_t \cdot v_g = \sum_{i=1}^{n} (x_{ti} x_{gi} + y_{ti} y_{gi}) \quad (2)$$

$$|v_t||v_g| = \sqrt{\sum_{i=1}^{n} (x_{ti}^2 + y_{ti}^2)} \sqrt{\sum_{i=1}^{n} (x_{gi}^2 + y_{gi}^2)} \quad (3)$$

However, it can be suboptimal to evaluate the similarity of two gestures by just looking at the angular distance calculated by Equation (1). As discussed above in connection with FIG. 4C, the vector representation of a gesture can be acquired by aligning the gesture's indicative orientation. Since the indicative angle is only an approximate measure of a gesture's orientation, the alignment in the preprocessing typically does not completely remove the noise in gesture orientation. This can lead to an imprecise measure of similarity and hence an incorrect prediction.

To address this issue, at runtime, a gesture recognizer can rotate the template (or alternatively the unknown gesture) by an extra amount so that it results in a minimum angular distance with the unknown gesture (or with the template) and better reflects their similarity. This rotation facilitates finding a minimum mean Euclidean distance between trajectories. However, rather than using an iterative approach to search for such a rotation, which can be time consuming and can result in use of a suboptimal rotation, a closed-form solution to find a rotation that leads to the minimum angular distance can be employed.

A preprocessed template gesture t can be rotated by an amount θ so that the resulting angular distance is (or at least approaches) the minimum (i.e., the similarity reaches its maximum). This can be formalize as:

$$\theta_{optimal} = \underset{-\pi \le \theta \le \pi}{\arg\min} \left( \arccos \frac{v_t(\theta) \cdot v_g}{|v_t(\theta)||v_g|} \right) \quad (4)$$

$v_t(\theta)$ represents the vector acquired after rotating template t by θ. Note that this is on top of any alignment rotation that is performed in the preprocessing. To minimize the cosine distance with respect to θ, one finds:

$$\frac{d\left( \arccos \frac{v_t(\theta) \cdot v_g}{|v_t(\theta)||v_g|} \right)}{d\theta} = 0 \quad (5)$$

Solving Equation (5) gives the following solution:

$$\theta_{optimal} = \arctan \frac{b}{a} \quad (6)$$

where a is the dot product of $v_t$ and $v_g$ (see Equation (2)) and b is given in Equation (7).

$$b = \sum_{i=1}^{n} (x_{ti} y_{gi} - y_{ti} x_{gi}) \quad (7)$$

With $\theta_{optimal}$ calculated, the maximum similarity (the inverse minimum cosine distance) between the two vectors can be readily acquired.

This similarity measure (or a further calculation based on it) can be used as the score for how well gesture template t predicts the unknown gesture g. The gesture template that has the highest score can become the top choice in a M-best candidate list. Thus, whether the gesture input matches the gesture template can be assessed based on the score of similarity.

Figure 4D:
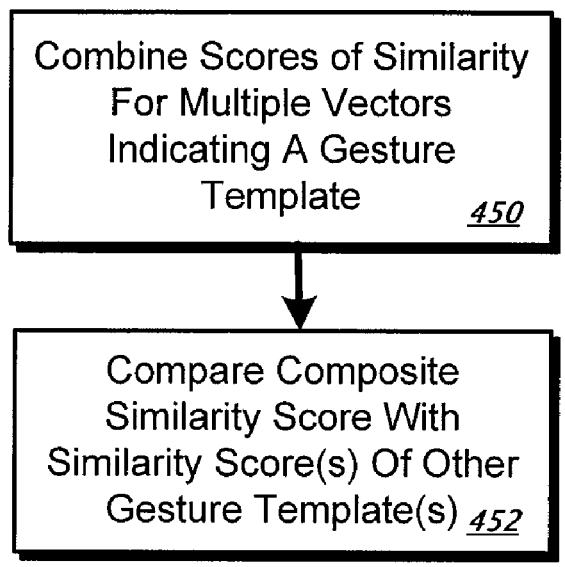
FIG. 4D is a flow chart showing an example of a process for assessing whether a gesture input matches a gesture template based on a score of similarity.

Various techniques can be used to perform this assessment (e.g., additional inputs can be used to select a final choice from the M-best candidate list). In addition, it should be noted that a single gesture template can be composed of multiple vector representation, such as when a user has provided more than one sample to represent a single gesture. In this vein, FIG. 4D is a flow chart showing an example of a process for assessing whether a gesture input matches a gesture template based on a score of similarity.

The score of similarity is combined 450 with an additional score of similarity to form a composite similarity score. The additional score of similarity is between the second vector representation (of the unknown gesture) and an additional vector representation of additional data indicating the gesture template. This combination can be a simple averaging of the scores, or a more complex combination.

The composite similarity score is then compared 452 with one or more other similarity scores corresponding to other gesture templates to find a closest match. For example, an M-best candidate list can be provided based on the composite similarity score (where the list can include an indication of which candidates are derived from composite similarity scores), and a final choice can be selected from the list. In other implementations, when multiple samples are available for a gesture, the one that has the highest score is used; so each gesture gets one score against the unknown gesture no matter how many samples a gesture has associated with it.

The following is an example of Java code that implements a closed-form solution for calculating the minimum distance between two gesture vectors in accordance with that which is shown and described above.

```
/**
 * Calculate the "minimum" cosine distance between two instances
 *
 * @param vector1
 * @param vector2
 * @param numOrientations the maximum number of orientation allowed
 * @return the distance between the two instances (between 0 and Math.PI)
 */
static double minimumCosineDistance(float[ ] vector1, float[ ] vector2, int numOrientations) {
    final int len = vector1.length;
    // a is the dot product of the two vectors
    double a = 0;
    double b = 0;
    for (int i = 0; i < len; i += 2) {
        a += vector1[i] * vector2[i] + vector1[i + 1] * vector2[i + 1];
        b += vector1[i] * vector2[i + 1] - vector1[i + 1] * vector2[i];
    }
    if (a != 0) {
        final double tan = b/a;
        final double angle = Math.atan(tan);
        if (numOrientations > 2 && Math.abs(angle) >= Math.PI / numOrientations) {
            return Math.acos(a);
        } else {
            final double cosine = Math.cos(angle);
            final double sine = cosine * tan;
            return Math.acos(a * cosine + b * sine);
        }
    } else {
        return Math.PI / 2;
    }
}
```

Various other implementations are also possible and can provide the advantages described herein. FIGS. 6A-6D are charts showing processing results of an exemplary gesture recognizer (named "Protractor") implemented in accordance with the present description. To understand how well Protractor performs, it is compared with the $1 Recognizer by repeating the same experiment on the same data set where the $1 Recognizer showed advantages over both the Rubine Recognizer and the DTW recognizers (see Zhai, S. and Kristensson, P.-O. Shorthand writing on stylus keyboard. CHI'03. 2003. p. 97-104). The data set includes 4800 samples for 16 gesture symbols collected from 10 participants (e.g., a star). This experiment was conducted on a Dell Precision T3400 with a 2.4 GHz Intel Quad Core™ 2 CPU and 4 GB memory running Ubuntu Linux.

Figure 6A:
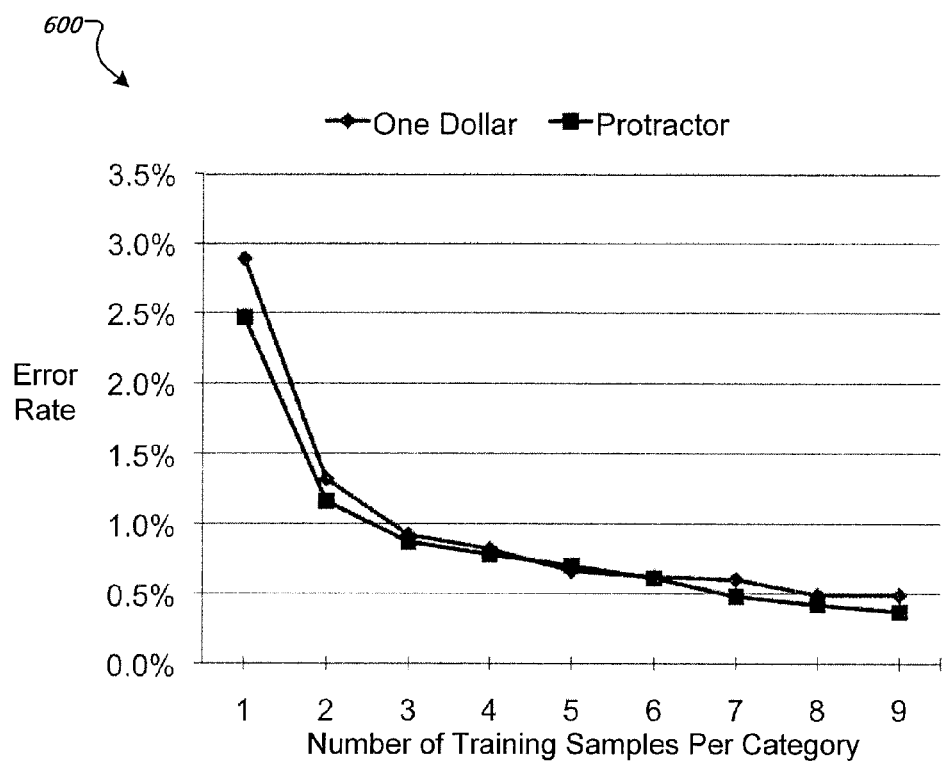
FIGS. 6A-6D are charts showing processing results of an exemplary gesture recognizer implemented in accordance with the present description.

Overall, Protractor and the $1 Recognizer generated a similar error rate curve in response to different training sample sizes, as shown in chart 600 in FIG. 6A. Although the overall Poisson regression model for predicting errors was statistically significant (p<0.0001), the major contributor to this significance is the training sample size and there was no significant difference between the recognizers (p=0.602).

Figure 6B:
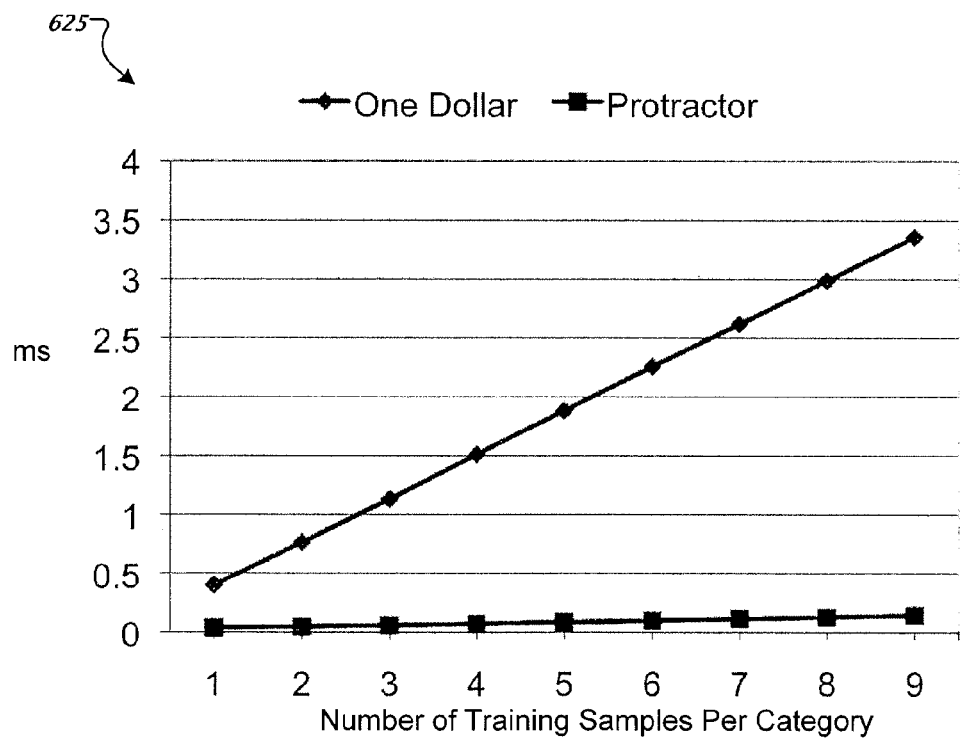
Figure 6C:
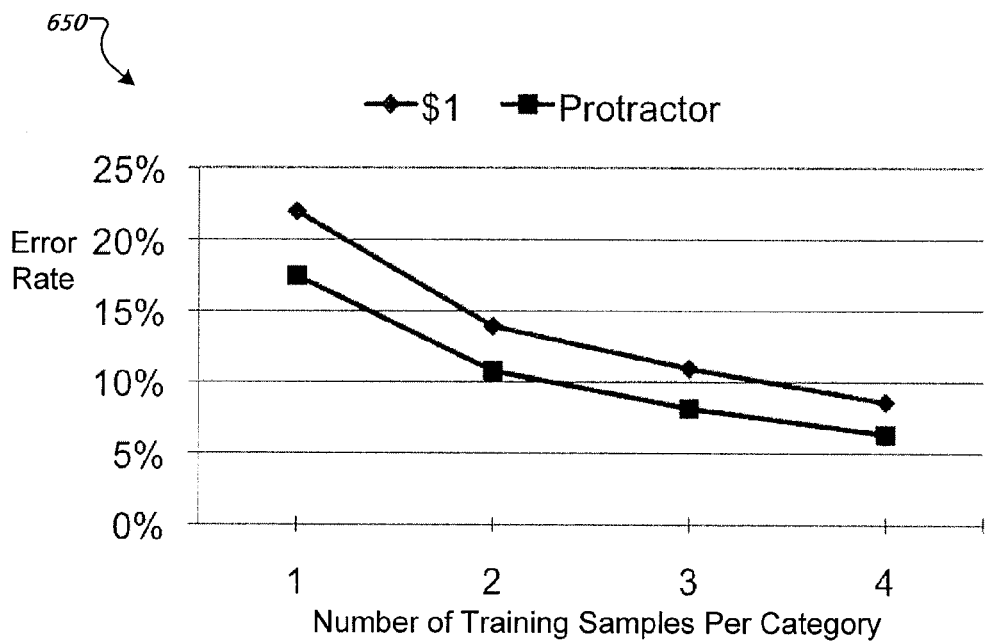

However, Protractor was significantly faster than the $1 Recognizer, as shown in chart 625 in FIG. 6B. Although the time, in milliseconds (ms), needed for recognizing a gesture increases linearly for both recognizers as the number of training samples grows, the $1 Recognizer increased at a much more rapid rate. For example, when 9 training samples are used for each of the 16 symbols, the $1 Recognizer took over 3 ms to recognize a gesture, while it took Protractor less than ½ ms to do so.

To better understand the impact of the time performance of these recognizers on mobile devices, the above experiment was repeated on a T-Mobile G1 phone running ANDROID™ software. When 9 training samples were used for each of the 16 gesture symbols, it took the $1 Recognizer 1405 ms (std=60 ms) to recognize a gesture, while it only took Protractor 24 ms (std=7 ms) to do so. The time cost of the $1 Recognizer grew rapidly as the number of training samples increased (mean=155 ms/16 templates, std=2 ms). As part of a process of continuous learning, a template-based recognizer needs to constantly add new training samples generated by user corrections. However, the rapidly growing latency of the $1 Recognizer makes it intractable to do so. In contrast, the time cost of Protractor grew at a much slower pace (mean=2 ms/16 templates, std=1 ms).

To understand how both recognizers perform on a different data set, they were tested on a larger gesture set that includes 10,888 single-stroke gesture samples for 26 Latin alphabet letters, which were collected from 100 users on their own touch screen mobile phones. Similar to the previous experiments, the data of each user was randomly split for training and testing based on different training sizes. Since each alphabet had at most 5 samples from each user, only training sizes from 1 to 4 were tested. On this data set, the error rates of both recognizers increased compared to that on the previous 16-symbol data set, as shown in chart 650 in FIG. 6C. The increase was primarily because the new data set is more complex as it includes 26 gesture categories, compared to 16 symbols of the previous data set. This gesture data was also collected in a more realistic situation than the laboratory environment that was used for the previous data set. Both recognizers show rapid improvement as the training size increases, as shown in chart 650. However, Protractor performed significantly more accurate than the $1 Recognizer on this data set (p<0.0001).

As Protractor can recognize variation in gesture orientation and aspect ratio, there is also a risk that it might pick up noise in these variations. However, based on the above experiments, Protractor is as accurate as the $1 Recognizer on the smaller data set (4800 samples/16 categories/10 users) and is significantly more accurate on the larger data set (10,888 samples/26 categories/100 users).

Figure 6D:
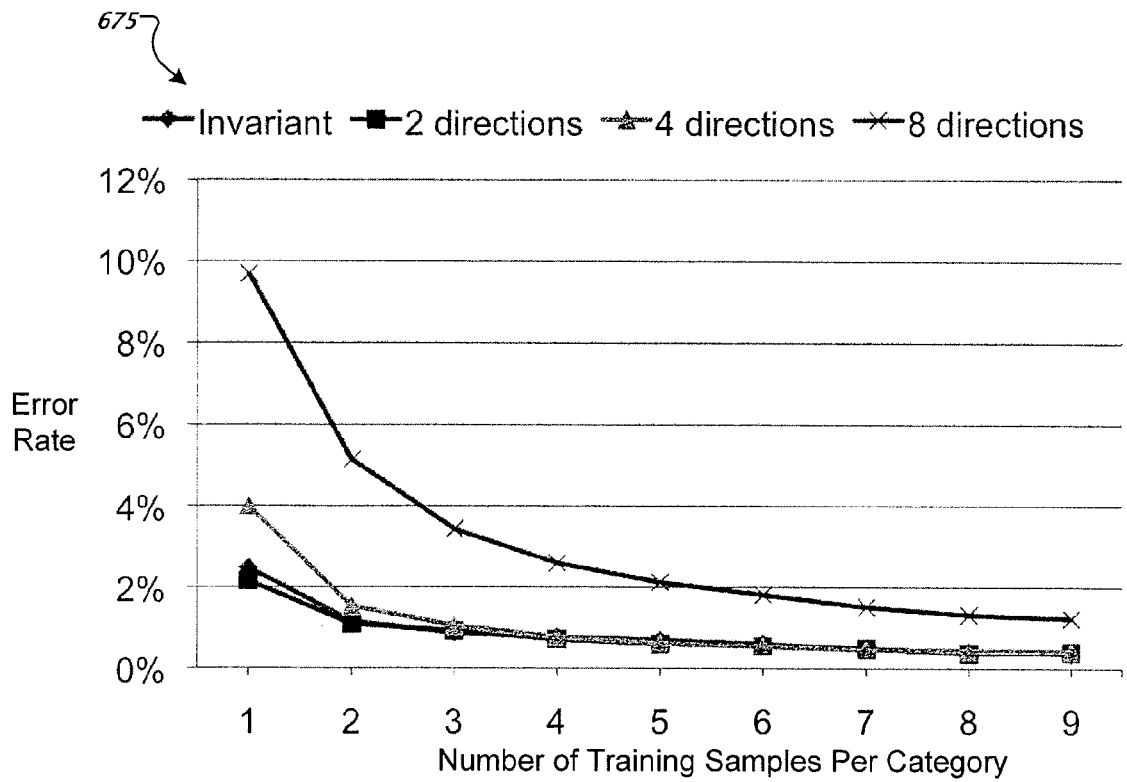

In addition to specifying whether Protractor should be orientation sensitive, a developer can also specify how sensitive it should be to orientation, e.g., whether two or four directions are allowed, which will bound the solution of Equation (6). At eight directions, Protractor started to pick up some noise in orientation, which led to an increase in error rates. Chart 675 in FIG. 6D shows the error rates of Protractor for different orientation sensitivities based on the tests with the 16-symbol data set.

As a nearest neighbor recognizer needs to load all of the training samples into memory before it can make a prediction, the amount of space needed is a critical factor, especially on mobile devices. Protractor used ¼ of the space that was required by the $1 Recognizer tested. With the closed-form solution, Protractor can also search through stored templates over 70 times faster than the $1 Recognizer tested on a T-Mobile G1 mobile phone.

Figure 7:
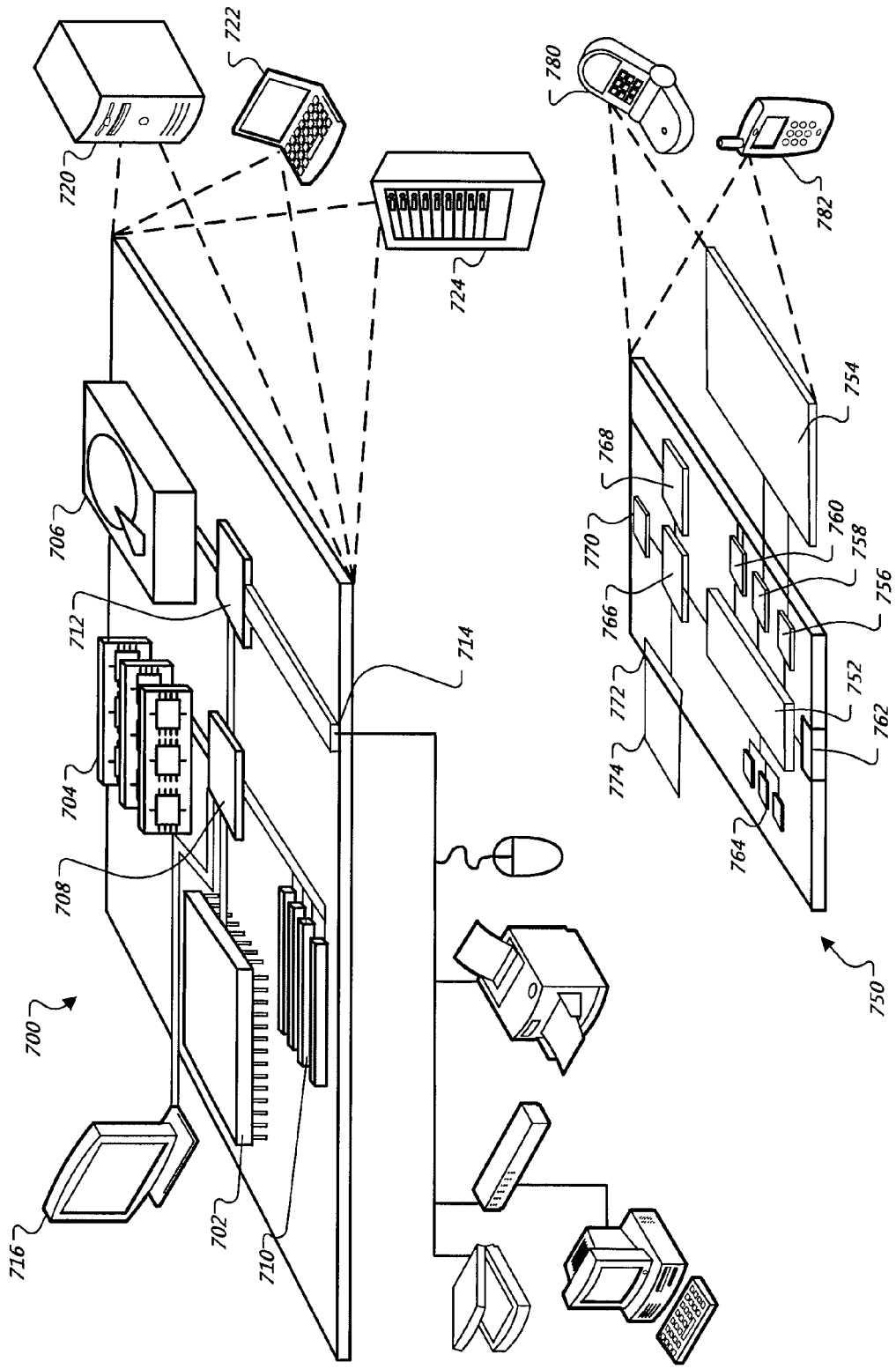
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In other implementations, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. An information carrier is a propagated signal or a computer-readable data storage medium. A computer-readable data storage medium is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In some implementations, the high-speed controller 708 is coupled to memory 704, display 716 (e.g., through a graphics processor or accelerator), and to high-speed expansion ports 710, which may accept various expansion cards (not shown). In some implementations, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a server computer 720, or multiple times in a group of such server computers. It may also be implemented as part of a rack server system 724. In addition, it may be implemented in a personal computer such as a laptop computer 722. Alternatively, components from computing device 700 may be combined with other components in a mobile device, such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In some implementations, a computer program product is tangibly embodied in an information carrier. The computer program product contains instructions that, when executed, perform one or more methods, such as those described above. An information carrier is computer-readable data storage medium or a propagated signal that may be received, for example, over transceiver 768 or external interface 762. A computer-readable data storage medium is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Device 750 may also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 750 and used to update the display of the respective devices 750 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, regardless of how received or length of storage.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, although various embodiments have been described based on touchscreen input, other input devices can also be used. Furthermore, although various example applications and user interfaces have been described, it will be appreciated that the present systems and techniques can be used with many different types of applications, software and user interfaces, including, but not limited to, messaging and mapping applications, interactive program guides, web page navigation and zooming, etc.

In addition, the logic flows depicted in the figures do not require the particular order shown, or sequential order, to achieve desirable results. Further, other steps may be provided, or steps may be eliminated, from the described flows, and other components may be added to, or removed from, the described systems. Accordingly, other embodiments are within the scope of the following claims.

What is claimed is:

1. A computer-implemented user interface method, comprising:
    displaying information on a touchscreen of a computing device;
    receiving from a user of the device an input drawn on the touchscreen;
    correlating a vector representation of the input to a vector representation of a template, where the correlating comprises employing a closed-form solution to find a rotation that reduces angular distance between the input and the template;
    where the employing comprises calculating the rotation, $\theta_{optimal}$, in accordance with a first equation, $$\theta_{optimal} = \arctan\frac{b}{a}, \text{ where}$$

$$a = v_t \cdot v_g = \sum_{i=1}^{n}(x_{ti}x_{gi} + y_{ti}y_{gi}), \text{ and } b = \sum_{i=1}^{n}(x_{ti}y_{gi} - y_{ti}x_{gi}),$$

$v_t$ corresponds to the vector representation of the template, $v_g$ corresponds to the vector representation of the input, $x_t$ corresponds to a first coordinate of $v_t$, $x_g$ corresponds to a first coordinate of $v_g$, $y_t$ corresponds to a second coordinate of $v_t$, and $y_g$ corresponds to a second coordinate of $v_g$; and
    providing output based on a result of the correlating.

2. The method of claim 1, where displaying the information comprises displaying content from an operating system or application operating on the device, and the correlating comprises identifying a user-defined glyph corresponding to the input.

3. The method of claim 1, where the input is defined by a pointer contact with the touchscreen followed by a pointer release from the touchscreen, and a pointer path traced on the touchscreen between the pointer contact and the pointer release.

4. The method of claim 1, comprising:
    preprocessing the input, before the correlating, in accordance with a predefined uniform representation.

5. The method of claim 4, where:
    the predefined uniform representation comprises vector representations of N points;
    the correlating comprises finding an angle between the vector representation of the input and the vector representation of the template in an N-dimensional space to generate a similarity score; and
    the employing comprises calculating the rotation from the vector representation of the input and the vector representation of the template.

6. The method of claim 5, where:
    the correlating comprises generating the similarity score, S, in accordance with a second equation, $$S(t, g) = \frac{1}{\arccos\frac{v_t \cdot v_g}{|v_t||v_g|}}.$$

7. The method of claim 4, where:
    the preprocessing comprises:
        resampling the input into a fixed number, N, equidistantly-spaced points,
        translating the points to place a centroid of the points at an origin of a coordinate space,
        determining whether the input is to be considered orientation invariant,
        rotating the translated points around the centroid in accordance with an indicative angle of the translated points, if the input is orientation invariant, to define the vector representation of the input, and
        aligning the translated points with one of multiple base orientations in the coordinate space, if the input is not orientation invariant, to define the vector representation of the input; and
    the correlating comprises:
        calculating the rotation in accordance with an arc tangent function,
        rotating the template in accordance with the rotation to generate the vector representation of the template, and
        calculating a similarity score from the vector representation of the input and the vector representation of the template in accordance with an arc cosine function.

8. An article comprising a non-transitory computer-readable data storage medium storing program code operable to cause one or more machines to perform operations comprising:
    receiving first data indicating a gesture template;
    modifying the first data to form a first vector representation;
    saving the first vector representation;
    receiving second data indicating a gesture input in a user interface;
    modifying the second data to form a second vector representation;
    calculating an adjustment angle using both the first and second vector representations as input, wherein the calculating comprises calculating the adjustment angle in accordance with an arc tangent function; and
    generating a score of similarity between the first and second vector representations, taking the adjustment angle into account, to assess whether the gesture input matches the gesture template, wherein the generating comprises generating the score of similarity in accordance with an arc cosine function.

9. The article of claim 8, where:
the generating comprises generating the score of similarity, S, in accordance with a first equation, $$S(t, g) = \frac{1}{\arccos\frac{v_t \cdot v_g}{|v_t||v_g|}},$$

where
$v_t$ corresponds to the first vector representation, t, and $v_g$ corresponds to the second vector representation, g; and
the calculating comprises calculating the adjustment angle, $\theta_{optimal}$, in accordance with a second equation, $$\theta_{optimal} = \arctan\frac{b}{a}, \text{ where}$$

$$a = v_t \cdot v_g = \sum_{i=1}^{n}(x_{ti}x_{gi} + y_{ti}y_{gi}), \text{ and } b = \sum_{i=1}^{n}(x_{ti}y_{gi} - y_{ti}x_{gi}),$$

$x_t$ corresponds to a first coordinate of the first vector, $x_g$ corresponds to a first coordinate of the second vector, $y_t$ corresponds to a second coordinate of the first vector, and $y_g$ corresponds to a second coordinate of the second vector.

10. The article of claim 8, where taking the adjustment angle into account comprises rotating the first vector representation by the adjustment angle, at runtime, before generating the score of similarity.

11. The article of claim 8, where modifying the first data and modifying the second data each comprise modifying input data by performing operations comprising:
resampling the input data into a fixed number, N, equidistantly-spaced points,
translating the points to place a centroid of the points at an origin of a coordinate space,
determining whether the input data is to be considered orientation invariant,
rotating the translated points around the centroid in accordance with an indicative angle of the translated points, if the input data is orientation invariant, to define an input vector, and
aligning the translated points with one of multiple base orientations in the coordinate space, if the input data is not orientation invariant, to define the input vector.

12. The article of claim 8, the operations comprising assessing whether the gesture input matches the gesture template based on the score of similarity, where the assessing comprises:
combining the score of similarity with an additional score of similarity, between the second vector representation and an additional vector representation of additional data indicating the gesture template, to form a composite similarity score; and
comparing the composite similarity score with one or more other similarity scores corresponding to other gesture templates to find a closest match.

13. A system comprising:
a graphical display to present at least a portion of a graphical user interface; and
a computing device including a gesture recognizer to receive user traces obtained with respect to the graphical display and to identify a user gesture in a received user trace in accordance with a process;
where the user gesture corresponds to a predefined gesture that is a valid input to the graphical user interface,
the predefined gesture is represented by one or more previously received user traces, and
the process correlates the received user trace with the one or more previously received user traces by employing a closed-form solution to find one or more rotations that reduce angular distance between the received user trace and respective ones of the one or more previously received user traces;
where the gesture recognizer is programmed to perform the process comprising:
modifying the one or more previously received user traces to form one or more first vector representations;
modifying the received user trace to form a second vector representation;
calculating an adjustment angle in accordance with an arc tangent function, for each of the one or more first vector representations, using data of the second vector representation and data of the first vector representation as input; and
generating a score of similarity in accordance with an arc cosine function, for each of the one or more first vector representations, taking each respective adjustment angle into account.

14. The system of claim 13, where:
the generating comprises generating the score of similarity, S, in accordance with a first equation, $$S(t, g) = \frac{1}{\arccos\frac{v_t \cdot v_g}{|v_t||v_g|}},$$

where $v_t$ corresponds to the first vector representation, t, and $v_g$ corresponds to the second vector representation, g; and
the calculating comprises calculating the adjustment angle, $\theta_{optimal}$, in accordance with a second equation, $$\theta_{optimal} = \arctan\frac{b}{a}, \text{ where}$$

$$a = v_t \cdot v_g = \sum_{i=1}^{n}(x_{ti}x_{gi} + y_{ti}y_{gi}), \text{ and } b = \sum_{i=1}^{n}(x_{ti}y_{gi} - y_{ti}x_{gi}),$$

where $x_t$ corresponds to a first coordinate of the first vector, $x_g$ corresponds to a first coordinate of the second vector, $y_t$ corresponds to a second coordinate of the first vector, and $y_g$ corresponds to a second coordinate of the second vector.

15. The system of claim 13, where taking the adjustment angle into account comprises rotating the first vector representation by the adjustment angle, at runtime, before generating the score of similarity.

16. The system of claim 13, where modifying the one or more previously received user traces and modifying the received user trace each comprise modifying input data by performing operations comprising:
resampling the input data into a fixed number, N, equidistantly-spaced points,
translating the points to place a centroid of the points at an origin of a coordinate space,
determining whether the input data is to be considered orientation invariant, rotating the translated points around the centroid in accordance with an indicative angle of the translated points, if the input data is orientation invariant, to define an input vector, and aligning the translated points with one of multiple base orientations in the coordinate space, if the input data is not orientation invariant, to define the input vector.

17. The system of claim 13, comprising a mobile phone including the graphical display and the computing device, and the graphical display comprises a touchscreen display device.

* * * * *